United States Patent Office 3,125,412
Patented Mar. 17, 1964

3,125,412
PROCESS OR THE MANUFACTURE OF ALKALI IMIDODIPHOSPHATES
Morris L. Nielsen, Dayton, Ohio, assignor to Monsanto Chemical Company, St. Louis, Mo., a corporation of Delaware
No Drawing. Filed Dec. 2, 1959, Ser. No. 856,656
9 Claims. (Cl. 23—107)

The present invention relates to a new process for the production of compositions of matter containing phosphorus and nitrogen. The invention relates particularly to new detergent formulations containing alkali salts of imidodiphosphates as builders and sequestering components, particularly in liquid detergent concentrates. The invention relates also to a new process for the manufacture of alkali imidodiphosphates.

It is an object of the invention to prepare alkali salts of imidodiphosphoric acid such as tetrasodium imidodiphosphate.

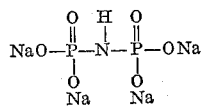

and tetrapotassium imidodiphosphate

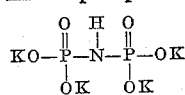

Tetrasodium imidodiphosphate has been made by older methods, but these processes have been characterized by the production of a very impure product, and also a very low yield.

The present invention for the preparation of alkali salts of imidodiphosphoric acid is based upon the reaction of diaryl imidodiphosphoric acids such as diphenyl imidodiphosphoric acid in the presence of an alkali hydroxide. Thus in the production of the tetrasodium imidodiphosphate, the alkali hydroxide is sodium hydroxide; similarly when the potassium salt is desired, potassium hydroxide is used as the reactant. The alkali hydroxide such as the lithium, sodium, potassium, rubidium, and cesium hydroxide is used in at least the stoichiometric proportion. However, in a preferred embodiment of the invention, alkali hydroxide is dissolved in the reaction medium. It has been found that the proportion of the alkali hydroxide such as sodium hydroxide may be considerably in excess of the stoichiometric proportion, preferably from 200% to 600% of the stoichiometry is desirable in this relationship.

The present reaction is preferably conducted in a liquid medium, such as an aqueous solution or in a higher alcohol, including glycols such as ethylene glycol or hexanol. The alcohols employed should boil in the range of from 120° C. to 200° C. The proportion of water or alcohols, including mixtures of water and alcohols in all proportions is not critical since the liquid medium need only dissolve the reactants.

The temperature employed in conducting the present reaction is in the range of from 120° C. to 200° C., a preferred range being from 120° C. to 150° C.

In addition to the embodiment of the invention set forth above, it has also been found that another improved embodiment of the invention may be conducted in which the pressure on the system is from 10 p.s.i. to 10,000 p.s.i., gauge. This pressure range is readily achieved by the use of a conventional pressure vessel such as an autoclave, or a continuous tubular reactor.

Another improvement in the present invention is the use of a dissolved salt medium in which the reaction is carried out. A preferred salt for this purpose is sodium phenoxide. Other salts which may be used in this relationship include potassium phenoxide, sodium formate and potassium formate. The proportion of the salt may be varied broadly, being added in sufficient amount to bring the boiling point of the reaction mixtures to the above temperature ranges.

The following examples illustrate specific embodiments of the invention:

Example 1

This example shows the preparation of tetrasodium imidodiphosphate from diphenyl imidodiphosphoric acid in the presence of sodium hydroxide.

To a flask fitted with a motor-driven stirrer and condenser was charged 6.6 grams (0.02 mole) diphenyl imidodiphosphoric acid $(C_6H_5O)_2PONHPO(OH)_2$ (prepared by the method of Kirsanov and Zhmurova, Zhur. Obshchei Khim. 28, 2478 (1958), cf. Chemical Abstracts 53, 3118i), 40 ml. water, and 24.8 grams (0.62 mole) sodium hydroxide. This represents about 400% excess sodium hydroxide. On heating to boiling, water was allowed to distill off until the boiling point reached 150° C., whereupon refluxing was continued for one hour. The mixture was cooled, dissolved in water and precipitated as crystals with denatured ethanol. On recrystallizing at about 40° C. from a water-alcohol system, a quantitative yield of pure sodium imidodiphosphate, $Na_4P_2O_6NH \cdot 10H_2O$, was obtained, as shown by nuclear magnetic resonance measurements.

Example 2

In order to obtain the anhydrous form of sodium imidodiphosphate, the decahydrate of Example 1 was dehydrated under a reduced pressure of 3 mm. and a temperature of 50° C. The product was found to be pure sodium imidodiphosphate by nuclear magnetic resonance measurements.

Example 3

This example shows the preparation of tetrasodium imidodiphosphate under pressure.

An autoclave was charged with 13.2 g. (0.04 mole) diphenyl imidodiphosphoric acid, 72 ml. water, and 19.2 g. (0.48 mole) sodium hydroxide. After heating to 135° C. (at a pressure of 28 p.s.i.g.) for one hour, the contents were cooled and precipitated with denatured ethanol. One recrystallization from water-ethanol gave pure sodium imidodiphosphate in 68% yield.

Example 4

This example shows the preparation of tetrasodium imidodiphosphate in the presence of sodium phenoxide.

A flask fitted with a stirrer, thermometer, and reflux condenser was charged with 6.6 g. (0.02 mole) diphenyl imidodiphosphoric acid, 50 ml. water, 17.6 g. (0.44 mole) sodium hydroxide, and 18.8 g. (0.20 mole) phenol. The proportion of sodium phenoxide was therefore 0.20 mole to 0.02 mole imidodiphosphate. The mixture was heated to boiling and water vapor allowed to escape until the pot temperature rose to 135° C. It was heated to reflux for 15 minutes at this temperature, then was cooled to 40° C. and the product precipitated with denatured alcohol. One recrystallization from water-ethanol gave essentially pure sodium imidodiphosphate in 95% yield. Analysis for carbon showed only 0.8%, indicative of a high order of purity.

*Example 5*

The use of potassium formate as an added salt was tried in an experiment similar to Example 4, but with a charge of 6.6 g. (0.02 mole) diphenyl imidodiphosphoric acid, 50 ml. water, and 9.6 g. (0.24 mole) sodium hydroxide and 20 g. (0.024 mole) of potassium formate. The product obtained was similar to that of Example 4. Analysis of the product showed that there was only sodium imidodiphosphate present, without any potassium compound.

*Example 6*

This experiment shows the preparation of tetrasodium imidodiphosphate in the presence of glycol or alcohol.

A mixture of 13.2 g. (0.04 mole) diphenyl imidodiphosphoric acid, 75 ml. water, and 12.0 g. (0.30 mole) sodium hydroxide was heated at the boiling point until a solution resulted. To this was added 125 ml. n-hexanol and boiling continued, with removal of water vapor, until the pot temperature reached 170° C. Refluxing was continued for eight hours, whereupon the solids were filtered off and recrystallized. A yield of 87% of product essentially imidodiphosphate by X-ray analysis resulted.

*Example 7*

This experiment shows the preparation of potassium imidodiphosphate.

A half gram of diphenyl imidodiphosphoric acid was dissolved in 20 ml. n-hexanol containing 1.02 g. potassium hydroxide (100% excess) and heated at reflux (about 155° C.) for 30 minutes. On distilling off some n-hexanol, solids were deposited. These were collected, washed with alcohol and ether, and identified as 0.4 g. tetrapotassium imidodiphosphate (80% of theory).

It has been found that detergent formulations of unusual efficiency, particularly liquid detergent concentrates may be formulated with the alkali imidodiphosphates and, in particular, the sodium imidodiphosphate as an essential constituent. Both liquid and dry detergent compositions are thus included in the present invention. The said alkali imidodiphosphates may be present accordingly as dry salts in conventional dry detergent formulations and also in high concentration liquid detergent concentrates.

It has been found that development of automatic detergent apparatus such as dishwashing machines, clothes washing machines, etc. requires the use of a very high concentration of the active components when such liquid concentrates are to be fed by automatic proportion machines into the washing apparatus. It is therefore a particular advantage of the present alkali imidodiphosphates that they are characterized by unusually high solubility in water so that they may be present as components of the active solutions in high concentration.

The alkali imidodiphosphates have been found to act as sequestrants and also as alkaline builders in the detergent formulation. The said alkali imidodiphosphates have been found, therefore, to suppress the precipitation of calcium soaps, i.e., the formation of soap scum and also to provide a buffered or controlled proportion of alkali which enables the conventional active organic components such as sodium dodecyl benzene sulfonate to operate at maximum efficiency.

What is claimed is:

1. Process for the preparation of tetrasodium imidodiphosphate which comprises heating diphenyl imidodiphosphoric acid in the presence of from 200% to 600% of the stoichiometric proportion of sodium hydroxide at a temperature in the range of from 120° C. to 200° C. the said two reactants being heated in aqueous solution.

2. Process for the preparation of tetrapotassium imidodiphosphate which comprises heating diphenyl imidodiphosphoric acid in the presence of from 200% to 600% of the stoichiometric proportion of potassium hydroxide at a temperature in the range of from 120° C. to 200° C. the said two reactants being heated in aqueous solution.

3. Process for the preparation of tetrasodium imidodiphosphate which comprises heating diphenyl imidodiphosphoric acid in the presence of from 200% to 600% of the stoichiometric proportion of sodium hydroxide at a temperature in the range of from 120° C. to 200° C. the said two reactants being heated in n-hexanol.

4. Process for the preparation of tetrapotassium imidodiphosphate which comprises heating diphenyl imidodiphosphoric acid in the presence of from 200% to 600% of the stoichiometric proportion of potassium hydroxide at a temperature in the range of from 120° C. to 200° C. the said two reactants being heated in n-hexanol.

5. Process for the preparation of tetra sodium imidodiphosphate which comprises heating diphenyl imidodiphosphoric acid in the presence of from 200% to 600% of the stoichiometric proportion of sodium hydroxide at a temperature of from 120° C. to 200° C., the said two reactants being heated in the presence of a solvent selected from the group consisting of water and nonreactive alcohols which boil in the range of from 120° C. to 200° C., and in the presence of a salt selected from the group consisting of sodium phenoxide, potassium phenoxide, sodium formate, and potassium formate, the said salt being present in an amount sufficient to maintain the boiling point of the mixture in the aforesaid reaction temperature range.

6. Process for the preparation of tetra potassium imidodiphosphate which comprises heating diphenyl imidodiphosphoric acid in the presence of from 200% to 600% of the stoichiometric proportion of potassium hydroxide at a temperature of from 120° C. to 200° C., the said two reactants being heated in the presence of a solvent selected from the group consisting of water and nonreactive alcohols which boil in the range of from 120° C. to 200° C., and in the presence of a salt selected from the group consisting of sodium phenoxide, potassium phenoxide, sodium formate, and potassium formate, the said salt being present in an amount sufficient to maintain the boiling point of the mixture in the aforesaid reaction temperature range.

7. Process for the preparation of a tetra alkali imidodiphosphate selected from the group consisting of the tetra sodium and tetra potassium imidodiphosphates which comprises heating diphenyl imidodiphosphoric acid in the presence of from 200% to 600% of the stoichiometric proportion of an alkali hydroxide selected from the group consisting of sodium hydroxide and potassium hydroxide, at a temperature of from 120° C. to 200° C., the said two reactants being heated in the presence of a solvent selected from the group consisting of water and nonreactive alcohols which boil in the range of from 120° C. to 200° C., and in the presence of a salt selected from the group consisting of sodium phenoxide, potassium phenoxide, sodium formate, and potassium formate, the said salt being present in an amount sufficient to maintain the boiling point of the mixture in the aforesaid reaction temperature range.

8. Process for the preparation of an alkali imidodiphosphate selected from the group consisting of tetra sodium imidodiphosphate and tetra potassium imidodiphosphate which comprises heating diphenyl imidodiphosphoric acid in the presence of from 200% to 600% of the stoichiometric proportion of the corresponding alkali hydroxide selected from the group consisting of sodium hydroxide and potassium hydroxide, at a temperature in the range of from 120° C. to 200° C., the said reactants being heated in aqueous solution.

9. Process for the preparation of an alkali imidodiphosphate selected from the group consisting of tetra sodium imidodiphosphate and tetra potassium imidodiphosphate which comprises heating diphenyl imidodiphosphoric acid in the presence of from 200% to 600% of the stoichiometric proportion of the corresponding alkali hydroxide selected from the group consisting of sodium hydroxide and potassium hydroxide, at a temperature in the range of from 120° C. to 200° C., the said two reactants being heated in n-hexanol.

References Cited in the file of this patent

Mellor: "Comprehensive Treatise on Inorganic and Theoretical Chemistry," volume 8, page 706.

Mellor: "Comprehensive Treatise on Inorganic and Theoretical Chemistry," volume 8, pages 708 and 709, Longmans, Green and Company.

UNITED STATES PATENT OFFICE

CERTIFICATE OF CORRECTION

Patent No. 3,125,412                                    March 17, 1964

Morris L. Nielsen

It is hereby certified that error appears in the above numbered patent requiring correction and that the said Letters Patent should read as corrected below.

In the heading to the printed specification, line 2, for "PROCESS OR" read -- PROCESS FOR --.

Signed and sealed this 4th day of August 1964.

(SEAL)
Attest:

ERNEST W. SWIDER                            EDWARD J. BRENNER
Attesting Officer                                Commissioner of Patents